(12) United States Patent
Shiue

(10) Patent No.: US 8,689,381 B2
(45) Date of Patent: Apr. 8, 2014

(54) METHOD OF PREPARING A RUBBER SHOE SOLE

(75) Inventor: Min-Chen Shiue, Wujie Township, Yilan County (TW)

(73) Assignee: Shei Chung Hsin Ind. Co., Ltd., Yilan County (TW)

( * ) Notice: Subject to any disclaimer, the term of this patent is extended or adjusted under 35 U.S.C. 154(b) by 590 days.

(21) Appl. No.: 13/085,768

(22) Filed: Apr. 13, 2011

(65) Prior Publication Data

US 2012/0260437 A1    Oct. 18, 2012

(51) Int. Cl.
*A43B 1/10*       (2006.01)
*A43B 13/04*     (2006.01)

(52) U.S. Cl.
CPC .. *A43B 1/10* (2013.01); *A43B 13/04* (2013.01)
USPC .................................. 12/142 RS; 12/146 BR

(58) Field of Classification Search
CPC ............ A43B 1/00; A43B 1/10; A43B 13/00; A43B 13/04
USPC ..... 12/146 BR, 142 E, 142 EV, 142 RS; 36/4
See application file for complete search history.

(56) References Cited

U.S. PATENT DOCUMENTS

| 2,124,986 | A | * | 7/1938 | Pipes | 36/59 C |
| 3,138,881 | A | * | 6/1964 | Bingham, Jr. | 36/30 R |
| 4,858,337 | A | * | 8/1989 | Barma | 36/4 |
| 6,662,840 | B2 | * | 12/2003 | Thielen et al. | 152/547 |
| 2011/0258886 | A1 | * | 10/2011 | Moon | 36/32 R |
| 2012/0198722 | A1 | * | 8/2012 | Imazato et al. | 36/84 |
| 2012/0260437 | A1 | * | 10/2012 | Shiue | 12/146 B |
| 2013/0203924 | A1 | * | 8/2013 | Lee et al. | 524/435 |

* cited by examiner

*Primary Examiner* — Marie Bays
(74) *Attorney, Agent, or Firm* — McClure, Qualey & Rodack, LLP

(57) ABSTRACT

Disclosed herein is a novel method of preparing shoe sole. The method of preparing shoe sole includes irradiating an uncured rubber sheet by laser beam to pattern and vulcanize a portion of the uncured rubber, tailoring the partially patterned vulcanized rubber into a shoe shape, and afterward fully vulcanizing the partially patterned vulcanized rubber sheet to form a shoe sole. An additional step of assembling the upper panel of shoe sole on the partially vulcanized rubber sheet is also performed.

10 Claims, 1 Drawing Sheet

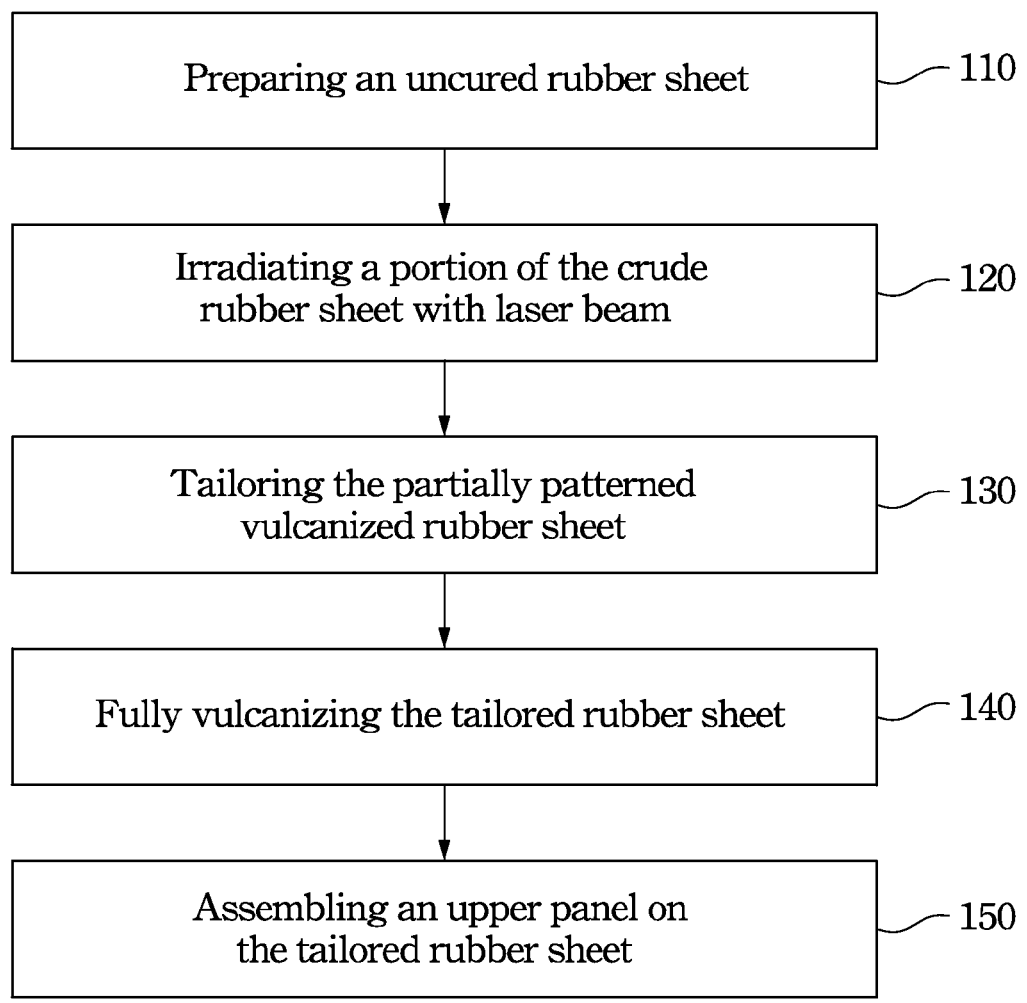

METHOD OF PREPARING A RUBBER SHOE SOLE

BACKGROUND

1. Field of Invention

The present invention relates to the method of preparing a shoe sole. More particularly, the present invention relates to preparing a shoe sole by partially vulcanizing the uncured rubber with laser irradiation.

2. Description of Related Art

Shoe sole is the bottom part of a shoe. Generally, a shoe sole has three parts, the insole, the midsole and the outsole.

The insole is the interior bottom of a shoe sole, which is in direct contact with the sock liner so as to provide good wearing comfort and protection. Insoles are usually made of cellulosic paper board or synthetic non-woven insole board.

The midsole is the layer between the outsole and the insole. The midsole may be made of a variety of materials to give the shoe various characteristics of cushioning, support, and flexibility. However, some shoes may not have a midsole at all.

The outsole directly meets the ground, and it is usually made of rubber, such as natural rubber or synthetic rubbers, depending on the design need. For example, black rubber outsole is a natural rubber or synthetic rubber with carbon black added, and the combination of these two materials creates a durable outsole suitable for working shoes. Also, the outsole may comprise a single piece, or may be an assembly of separate pieces of different materials. In the shoe industry, the outsoles are often referred to as the "sole" of the shoe.

The conventional way of making the outsole is complicated, time-consuming and costly. In one example, the uncured rubber and the vulcanization agent and/or other fillers are uniformly mixed together first, and then the mixed rubber is completely vulcanized in the mold with a predetermined shape with or without a pattern. However, molds for various shoe sizes should be made in order to produce various shoe sole sizes in some conventional production methods. Making those molds is expensive and time-consuming, resulting in high production cost. In addition, the outsole shapes and patterns are vulcanized and fixed during the vulcanizing process in the mold. If a new design and size of the shoe sole is needed, some additional cut or scribe processes are needed in order to modify the outsole shapes or patterns, or otherwise new molds need to be produced to fit the particular designs and sizes. Finally, the outsole is laminated with the midsole (if any) and the insole to become a shoe sole, and the shoe sole is stitched, glued or fixed to the other panels of the shoe to form a shoe.

In view of the foregoing, there exists a need in the art for providing a time- and cost-effective way for manufacturing outsoles.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

The present invention provides a method for preparing a shoe sole. As could be appreciated from this summary and the following detailed description of the present application, the outsoles could be partially vulcanized and patterned before the full vulcanization step, which improves the variability of the shoe-manufacturing process. As such, the method provides a time- and cost-effective way for shoe outsole manufacturing.

In one aspect, the present invention is directed to a method for preparing the shoe sole. According to one embodiment of the present invention, the process comprises the steps as follows. First of all, an uncured rubber sheet is prepared. Generally, the uncured rubber sheet provided herein comprises a rubber and a vulcanizing agent. Afterwards, laser beam is applied to irradiate a portion of the uncured rubber sheet in order to pattern the uncured rubber sheet and partially vulcanize the uncured rubber sheet at the same time, forming a partially patterned vulcanized rubber sheet. The partially patterned vulcanized rubber sheet is tailored into a desired shape. Finally, the partially patterned vulcanized rubber sheet is fully vulcanized to form the shoe sole.

According to one embodiment of the present invention, the partially patterned vulcanized rubber sheet has a plurality of grooves resulting from the irradiation of the laser beam. In optional embodiments, the depths of the grooves are 40%-80% of the thickness of the partially patterned vulcanized rubber sheet.

According to another embodiment of the present invention, the steps of preparing the shoe sole also comprise assembling an upper panel on top of the partially patterned vulcanized rubber sheet before or after fully vulcanizing the tailored rubber sheet.

This method provided herein of preparing a shoe sole is easier to manufacture and more cost-effective without any mold cost. In the embodiment of the present invention, the uncured rubber sheet is patterned as well as partially vulcanized by irradiation of the laser beam in one step. Especially, the partially patterned vulcanized rubber sheet could be further tailored into the desired shapes or sizes to meet the particular design before it is fully vulcanized. Furthermore, the upper panels could also be assembled on the partially vulcanized shoe sole before or after fully vulcanizing the shoe sole, which reduces the lamination or sewing process of the conventional shoe production method. Therefore, the presented shoe sole preparation methods solve the conventional labor-intensive shoe sole production issues, and provide an easier, faster and more cost-effective way of making shoe soles.

Many other advantages and features of the present invention will become manifest to those skilled in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present description can be more fully understood by reading the following detailed description of the embodiment, with reference made to the accompanying drawings as follows:

FIG. 1 shows a flowchart of a method for preparing a shoe sole in accordance with one embodiment of the present invention.

DETAILED DESCRIPTION

The detailed description provided below in connection with the appended drawings is intended as a description of the present example and is not intended to represent the only forms in which the present example may be constructed or utilized. The description sets forth the functions of the example and the sequence of steps for constructing and operating the example. However, the same or equivalent functions and sequences may be accomplished by different examples.

FIG. 1 is a flowchart illustrating a method for preparing a shoe sole according to one embodiment of the present invention.

In step 110, an uncured rubber sheet is prepared. Generally, the uncured rubber sheet comprises a rubber and a vulcanizing agent, wherein the weight ratio of the vulcanizing agent to the rubber is 0.01-0.05. The thickness of the uncured rubber sheet prepared herein can be in any ranges. For example, the thickness of the uncured rubber sheet is 1.0-3.6 mm, such as 1.6 mm.

The rubber used in this method is not limited, and thus any rubber that is used in the sole-manufacturing processes is suitable in the present method herein. Specifically, the rubber could be natural rubber, a synthetic rubber or a combination of the above. In alternative embodiments, the rubber may comprise a combination of a synthetic rubber and natural rubber. For example, the synthetic rubber includes, but is not limited to: polychloroprene rubber (CR), styrene-butadiene rubber (SBR) and ethylene propylene diene monomer rubber (EPDM).

Vulcanizing agents are usually sulfur-containing organic compounds, which are usually applied in rubber processing for turning the rubber into more durable materials. Vulcanizing agent could modify the polymer or rubber by forming cross-linkages (bridges) between the individual units of the polymer chain, and the polymer or rubber generally can be hardened or vulcanized after the heating process. Therefore, laser irradiation provided herein in this method is to offer the uncured rubber sheet with heat (thermal energy) for vulcanization process and as well as to cut the uncured rubber sheet into the desired pattern on the uncured rubber sheet. Generally, the vulcanizing agents are sulfur, metal oxide or peroxide-based compounds. The vulcanizing agent used in this method is chosen based on the rubber itself or the application purpose.

According to one embodiment of the present invention, the weight ratio of the vulcanizing agent to the rubber is 0.01-0.05. Specifically, the weight ratio of the vulcanizing agent to the rubber could be 0.01, 0.02, 0.03, 0.04 or 0.05. For example, 1-3 parts by weight of sulfur can be applied as the vulcanization agent when 100 parts by weight of natural rubber is provided as the rubber. In another example, below 1.5 parts by weight of sulfur is applied when 100 parts by weight of EPDM is provided as the rubber.

As could be appreciated by those with ordinary skill in the art, the uncured rubber may further comprise a softener and/or a filler according to optional embodiments of the present invention. For example, the filler, such as silica powder or carbon black, could be additionally mixed with the uncured rubber for strengthening purpose.

According to one optional embodiment of the present invention, the uncured rubber can also comprise additional accelerator(s) and/or activator(s) for modifying the kinetics of the vulcanization process. The activators and accelerators used in sole-manufacturing processes are suitable in the present step as well. Specifically, the accelerators can be 2-mercaptobenzothiazole (MBT), 2,2'-dibenzothiaolyl disulfide (MBTS), tetramethyl thiuram monosulfide (TMTM), or 1,3-diphenylguanidine (DPG). Activator can be ZnO. For example, MBT could act as accelerator, and ZnO could act as activator when natural rubber is provided as the rubber. In another example, suitable amounts of ZnO (activator), DPG (accelerator) and sulfur (vulcanizing agent) can be mixed with natural rubber. In another optional exemplary embodiment, suitable amounts of DPG (accelerator) and sulfur (vulcanizing agent) can be mixed with CR.

In step 120, the uncured rubber sheet is partially patterned and vulcanized by irradiation of laser beam and thereby obtaining a partially patterned vulcanized rubber sheet. In the foregoing mentioned, the laser irradiation provided herein is not only cutting the uncured rubber sheet to form the desired patterns, but also offering heat (thermal energy) to vulcanize the irradiated uncured rubber regions and those neighboring irradiated regions.

The cutting pattern on the partially patterned vulcanized uncured rubber sheet is not limited. In one optional embodiment, the cutting patterns on the partially patterned vulcanized uncured rubber sheet could be lines, holes, grooves or a combination above. For example, the width or diameter of the lines, holes, or grooves above can be smaller than 0.5 mm.

According to one embodiment of the present invention, the partially patterned vulcanized rubber sheet is formed with a plurality of grooves by the irradiation of the laser beam in step 120. The plurality of grooves formed on the partially patterned vulcanized rubber could be in any kind of pattern. In other examples, the depths of the grooves are 40%-80% of the thickness of the partially patterned vulcanized rubber sheet.

The power of the laser beam is 26-100 W in this method. The laser beam power could be adjusted to a suitable range depending on the patterns of the partially patterned vulcanized rubber. For example, the power of the laser beam is 26-45.5 W to form the grooves. The moving rate of the laser beam is based on the power of the laser beam, and thus the moving rate is not limited. The wavelength of the laser beam can be in any wavelength number in this method.

Besides, the cooling water provided around the laser beam device is to cool down the temperature of the laser, and thus the laser device could provide the stabilized laser power. The temperature of the cooling water is around the room temperature. For example, the temperature of the cooling water can be under ±4° C. variance, compared with room temperature.

In step 130, the partially patterned vulcanized rubber sheet is tailored by any available methods, such as by laser cutting. The tailoring step provided herein is to cut the partially patterned vulcanized rubber into the desired shoe shape. For example, the partially patterned vulcanized rubbers sheet can be tailored into any size of shoe shapes after the tailoring step.

In step 140, the tailored rubber sheet is fully vulcanized to form the shoe sole. The device for the fully vulcanizing step can be performed in any rubber processing oven. The fully vulcanizing step can be conducted in any vulcanizing process of the shoe sole-manufacturing industry. In one embodiment, the vulcanizing conditions, such as temperature, pressure or time, can be adjusted depending on the specific material of the upper panel used. For example, the condition of the fully vulcanizing process is under a pressure of 2 kg/cm$^2$ at a temperature of 110-140° C., and the fully vulcanizing process time is 40-70 minutes.

In step 150, the upper panels of a shoe are assembled with the tailored rubber sheet according to one embodiment of the present invention. The upper panels could be formed in any kind of shapes or configurations. The material of the upper panels can be made of leather, fabric, rubber, metal or a combination of the above. However, the assembling step 150 is not only limited to being performed after step 140. It could be performed before the fully vulcanizing process alternatively. In optional embodiments, the upper panels are chosen to be made of the materials which can withstand the high temperature when the upper panels are assembled before the fully vulcanizing step. For example, the upper panels can be made of uncured rubber when performing assembling step 150 before step 140. In this case, the upper panels and the partially patterned vulcanized rubber sheet of step 130 could be both fully vulcanized and bonded together simultaneously. In this case, the shoe sole preparation process is completed without any additional sewing or lamination processes.

Irradiating Natural Rubber with Different Laser Power

The following examples are provided for making the understanding of the present invention easier, although they are only for exemplification and are not intended to limit the characteristic features of the present invention thereto.

The uncured rubber sheet used herein was natural rubber (NR), and the thickness of the uncured rubber sheet was 1.6 mm. The vulcanizing agent was sulfur in example 1-4, and the applied weight ratio of natural rubber to sulfur was 1-5%. The laser cutting condition was listed in the Table 1, and the cooling water temperature of the laser was 18° C., and the room temperature was 19° C. The preparation method was followed by the steps instructed in FIG. 1. The resulting groove depths by the laser cutting are listed on the Table 1.

TABLE 1

The laser cutting parameters and the resulting groove depths.

| | Laser Cutting Condition | | | |
|---|---|---|---|---|
| Example | Space between laser needle-point and rubber sheet (mm) | Power (W) | Actual moving rate (cm/sec) | The depth of the grooves (mm) |
| 1 | 8 | 26 | 5 | 0.8-1.1 |
| 2 | 8 | 32.5 | 6 | 0.8-1.0 |
| 3 | 8 | 39 | 8 | 0.9-1.0 |
| 4 | 8 | 45.5 | 9 | 1.0-1.2 |

From Table 1, the depths of the grooves are 0.8-1.2 mm in Examples 1-4. It is also observed that the larger power of the laser cutting resulting in higher depths of the grooves on the partially vulcanized rubber sheet.

In the embodiments, the shoe soles could be made into any kind of shoes. For example, the shoe soles can be made into boots, trainers, sandals or flip-flops. Preferably, the shoe sole of the present embodiment can be made into boots, sports shoes or the shoes especially for water sports or water activity purposes.

Polychloroprene rubber was also applied in similar tests as shown above. The test results of polychloroprene rubber are similar to the results in Table 1, and thus the data are omitted here.

Accordingly, the rubber shoe sole is partially vulcanized by the laser irradiation process, and the partially vulcanized shoe sole could be further tailored into desired sizes and shapes before fully vulcanizing. Therefore, the various requirements of the shoe-manufacturing process can be easily satisfied. The processes provided herein reduce the cost of shoe sole production due to not using any molds. Furthermore, the upper panels could also be assembled on the partially vulcanized shoe sole before or after fully vulcanizing the shoe sole, which reduces the lamination or sewing process of the conventional shoe production method. As such, the method provides a time- and cost-effective way to manufacture the outsoles of shoes.

References in the singular may also include the plural (for example, "a" and "an" may refer to one, or one or more) unless the context specifically states otherwise. The use of numerical values in the various ranges specified in this application, unless expressly indicated otherwise, are stated as approximations as though the minimum and maximum values within the stated ranges were both preceded by the word "about". In this manner, some variations above and below the stated ranges can be used to achieve substantially the same results as values within the ranges. Also, the disclosure of these ranges is intended as a continuous range including every value between the minimum and maximum values.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A method for preparing a shoe sole, comprising steps of:
   preparing an uncured rubber sheet comprising a rubber and a vulcanizing agent, wherein the weight ratio of the vulcanizing agent to the rubber is 0.01-0.05;
   irradiating the uncured rubber sheet by a laser beam to form a pattern on the uncured rubber sheet and simultaneously vulcanizing the irradiated part of the uncured rubber sheet;
   tailoring the partially patterned vulcanized rubber sheet into a shoe shape; and
   fully vulcanizing the tailored rubber sheet to obtain the shoe sole.

2. The method of claim 1, wherein the rubber is natural rubber, a synthetic rubber, or a combination thereof.

3. The method of claim 2, wherein the synthetic rubber is polychloroprene rubber, styrene-butadiene rubber or ethylene propylene diene monomer rubber.

4. The method of claim 1, wherein the pattern is lines, holes, grooves, or a combination thereof.

5. The method of claim 4, wherein the depths of the grooves are 40%-80% of the thickness of the uncured rubber sheet.

6. The method of claim 1, wherein the power of the laser beam is 26-100 W.

7. The method of claim 1, further comprising a step of assembling an upper panel on the tailored rubber sheet before or after the fully vulcanizing step.

8. The method of claim 1, wherein the fully vulcanizing step is performed at a pressure under 2 kg/cm$^2$ and a temperature of 110-140° C.

9. The method of claim 1, wherein the uncured rubber further comprises at least one filler.

10. The method of claim 9, wherein the filler is silica powder or carbon black.

* * * * *